United States Patent Office 3,442,917
Patented May 6, 1969

---

3,442,917
2β,3β,14α - 22β,25 - PENTA HYDROXY - 5β - CHOLEST-7-EN-6-ONE AND PROCESS FOR THE PRODUCTION THEREOF
Rudolf Wiechert, Ulrich Kerb, and Peter Hocks, Berlin, Germany, assignors to Schering A.G., Berlin, Germany
No Drawing. Filed July 7, 1965, Ser. No. 470,189
Claims priority, application Germany, July 13, 1964, Sch 35,464
Int. Cl. C07c *169/62, 167/00;* C12b *1/00*
U.S. Cl. 260—397.2                                                2 Claims

ABSTRACT OF THE DISCLOSURE

A compound of the formula

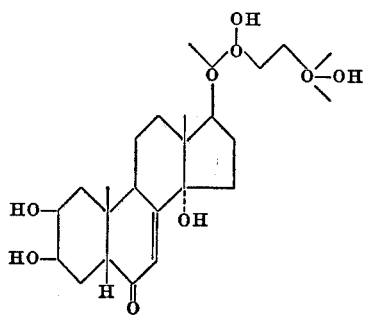

prepared by introducing a hydroxyl group in the 14α position thereof.

---

The present invention relates to a method of preparing novel 14α-hydroxysteroids of the formula, as follows:

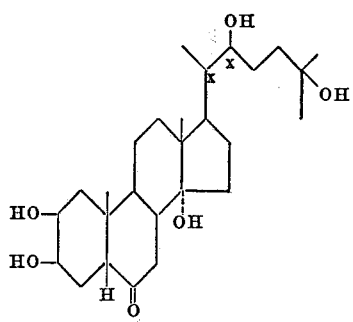

which will be understood to include the several groups of four diastereomers obtained by varying the steric arrangement of the carbon atoms indicated by $x$, and mixtures of the several diastereomers in all proportions.

The new products obtained by the method of the invention are superior hormones affecting the metamorphosis of insects. They also profoundly influence the cell metabolism of other living creatures, particularly warm-blooded animals. We have also observed effects on the central nervous system. The products are therefore applicable in many fields, for example, as pharmaceutical agents in hormone treatment and veterinary medicine, and as pesticides for protecting plants (see Science 143, 325, 1964).

The novel compounds are formed by introducing a hydroxyl group in position 14α of a compound of the formula

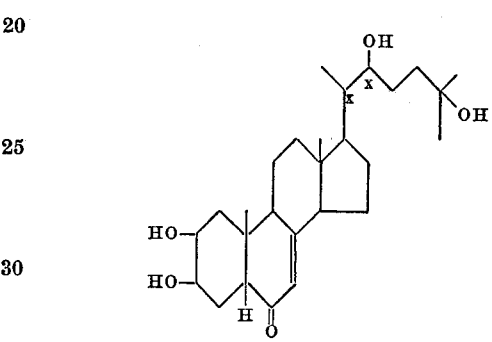

by any known method of steroid chemistry which may be a chemical method, preferably using selenious acid, or a biochemical method, preferably employing microorganisms or enzymes produced by said organisms which are known 14α-hydroxylating agents, such as enzymes from the species of the genera Curvularia or Heliocostylum, as well as *Absidia regnieri*. If it is preferred to obtain a pure diastereomer rather than a mixture of several diastereomers, a sterically homogeneous starting material is obtained, or the components of a mixture of diastereomers originally obtained are separated by known methods, known in themselves, such as fractional distillation, chromatography, or counter current partition.

The starting material which has not been described in the literature heretofore, and whose preparation is not being claimed in this application may be prepared by the conventional methods of stereochemistry from $\Delta^{7,22}$-ergostadiene - 3β,5α-diol-6-one - 3-acetate by the following sequence of reactions:

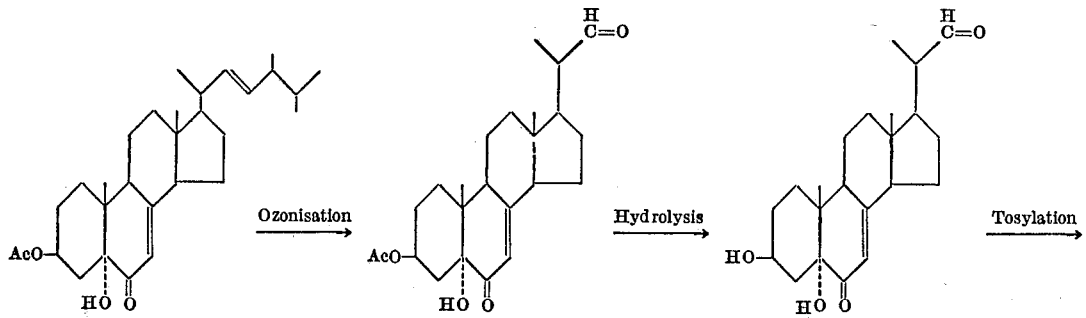

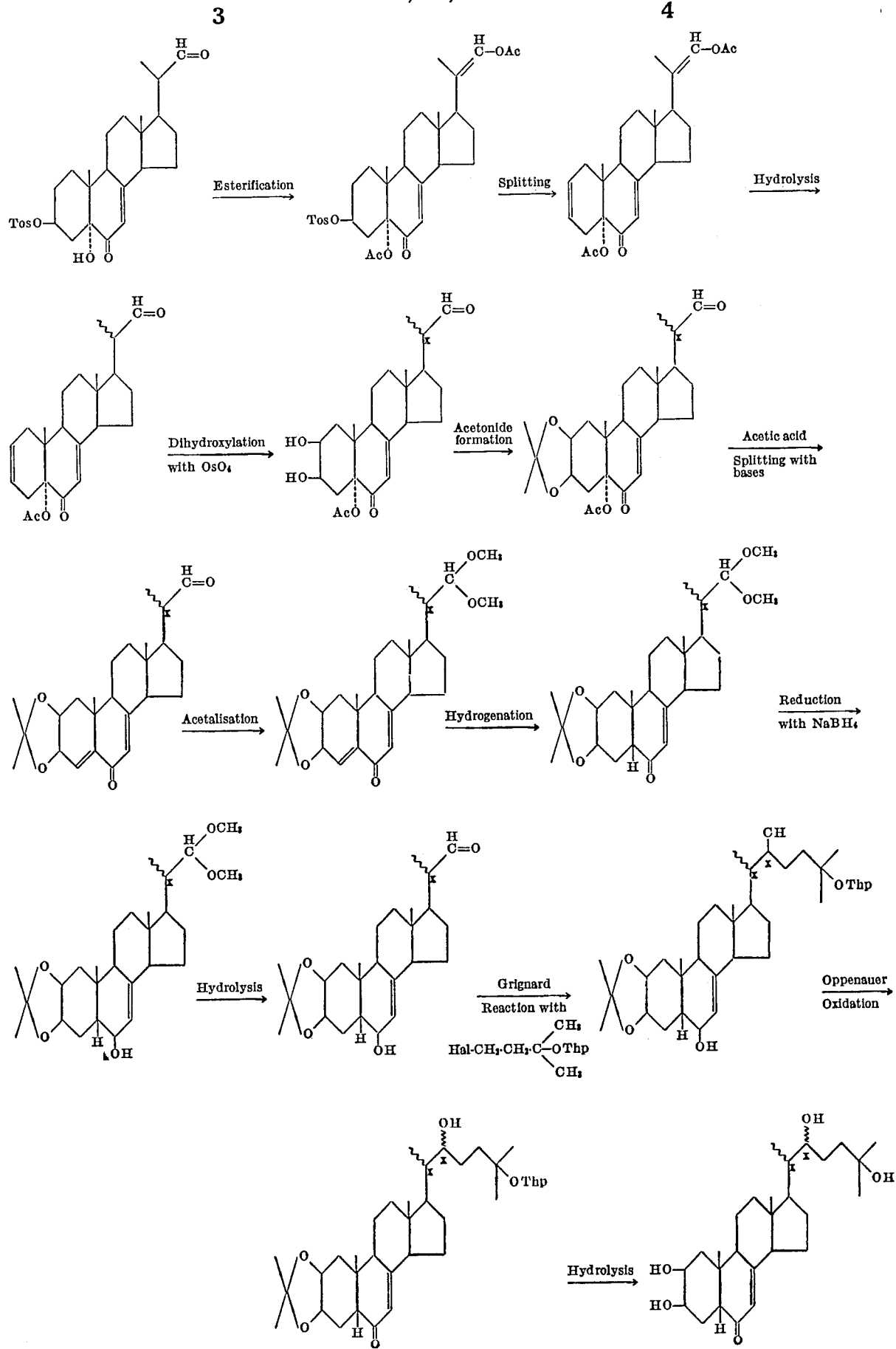
Ac=acetyl; Tos=Tosyl; Thp=Tetrahydropyranyl.

EXAMPLE 1

A mixture of 450 mg. 20-(1′,4′-dihydroxy-4′-methylpentyl)-Δ⁷-5β-pregnene-2β,3β-diol-6-one in 25 ml. benzene, 30 ml. acetic acid, and 15 ml. of a 0.1 normal solution of selenious acid in acetic acid was stored 25 hours at 0–5° C. Ethyl ether and water were then added, and the organic phase was washed with water and potassium hydrogen carbonate solution until it was free from acid. It was thereafter dried over desiccated sodium sulfate, filtered, and evaporated to dryness in a vacuum. The residue was subjected to thin layer chromatography, and the 20-(1′,4′-dihydroxy-4′-methylpentyl)-Δ⁷-5β-pregnene-2β,3β,14α-triol-6-one was isolated.

Ultraviolet: $E_{241}$=12,100 (methanol).

Infrared: (KBr) 3333/cm.⁻¹, 2940 cm.⁻¹, 1657 cm.⁻¹.

Nuclear magnetic resonance (proton resonance spectrograph "Varian 60," reference substance tetramethylsilane, perdeuterated pyridine):

0.70 p.p.m. (3 protons)
1.05 p.p.m. (3 protons)
1.19 p.p.m.⎫
1.30 p.p.m.⎭ (3 protons, doublet)
1.38 p.p.m. (6 protons)
5.75 p.p.m. (4 hydroxyl protons)
6.31 p.p.m. (vinyl proton)

EXAMPLE 2

200 ml. of an aqueous medium containing 4.5% glucose, 2% peptone, and 0.5% corn steep liquor were sterilized in a shaking flask. The medium was inoculated with *Absidia regnieri* and was cultivated with shaking for two days at 28° C. 90 milligrams 20-(1′,4′-dihydroxy-4′-methylpenthyl)-Δ⁷-5β-pregnene-2β,3β-diol-6-one dissolved in 5 ml. 2.5% methanol were added to the culture. When the completion of fermentation was determined by thinlayer chromatography, the cells were filtered off and extracted with acetone and ethyl acetate. The filtrate was extracted with ethyl acetate, and all extracts were combined. The combined extracts were washed with aqueous sodium bicarbonate solution and water, dried over desiccated sodium sulfate, and evaporated to dryness in a vacuum. Pure 20-(1′,4′-dihydroxy-4′-methylpentyl)-Δ⁷-5β-pregnene-2β,3β, 14α-triol-6-one was isolated by thin layer chromatography from the residue. This product has the following characteristics:

Ultraviolet: $E_{241}$=12,100 (methanol).

Infrared: (KBr) 3333 cm.⁻¹, 2940 cm.⁻¹, 1657 cm.⁻¹.

Nuclear magnetic resonance (proton resonance spectrograph "Varian 60," perdeuterated pyridine, reference substance tetramethyl silane):

0.70 p.p.m. (3 protons)
1.05 p.p.m. (3 protons)
1.19 p.p.m.⎫
1.30 p.p.m.⎭ (3 protons, doublet)
1.38 p.p.m. (6 protons)
5.75 p.p.m. (4 hydroxyl protons)
6.31 p.p.m. (vinyl proton)

EXAMPLE 3

An aqueous nutrient solution was prepared from:

| | Percent |
|---|---|
| Sucrose | 5 |
| Beet sugar molasses | 1 |
| NaNO₃ | 0.2 |
| KH₂PO₄ | 0.1 |
| KCl | 0.05 |
| MgSO₄ | 0.05 |
| FeSO₄ | 0.001 |
| Corn steep liquor, pH⁷ | 0.05 |

The solution was sterilized at 120° C. for 90 minutes. After cooling to ambient temperature, it was inoculated with a spore suspension of *Curvularia lunata* which had been obtained by washing a seven day culture on corn with physiological saline solution.

The culture was permitted to propagate for two days at 25° C. while being agitated and aerated, and 280 ml. thereof were withdrawn under sterile conditions. The specimen taken was transferred to a fermentation vat containing 4.7 liters of an aqueous nutrient solution of 5% sucrose, 1% beet sugar molasses, 0.2% NaNO₃, and 0.1% KH₂PO₄. After 24 hours of cultivation at 25° C. with agitation and aeration, a solution of 1.13 g. 20-(1′,4′-dihydroxy-4′-methylpentyl)-Δ⁷-5β-pregnene-2β,3β-diol-6-one in 50 ml. ethanol was added. The fermentation mixture was worked up as described in Example 2, after fermentation had been completed and the 20-(1′,4′-dihydroxy-4′α-methylpentyl)-Δ⁷-5β-pregnene-2β,3β,14α-triol-6-one was isolated.

Ultraviolet: $E_{241}$=12,100 (methanol).

Infrared: (KBr) 3333 cm.⁻¹, 2940 cm.⁻¹, 1657 cm.⁻¹.

Nuclear magnetic resonance (proton resonance spectrograph "Varian 60," perdeuterated pyridine, reference substance tetramethyl silane):

0.70 p.p.m. (3 protons)
1.05 p.p.m. (3 protons)
1.19 p.p.m.⎫
1.30 p.p.m.⎭ (3 protons, doublet)
1.38 p.p.m. (6 protons)
5.75 p.p.m. (4 hydroxyl protons)
6.31 p.p.m. (vinyl proton)

We claim:
1. The method of preparing a 14α-hydroxysteroid of the formula

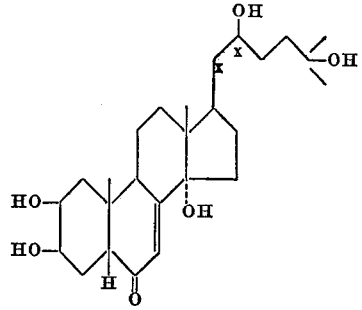

which comprises introducing a hydroxyl radical in position 14α in a compound of the formula

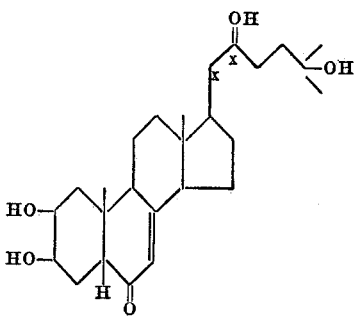

by treating the same with a substance selected from the group consisting of:
(a) selenious acid; and
(b) microorganisms known to produce enzymes adapted to cause 14α-hydroxylation, the microorganisms themselves being those of species of the genera *Curvularia*, *Heliocostylum*, as well as *Absidia regnieri*.

2. A synthetic compound of the formula
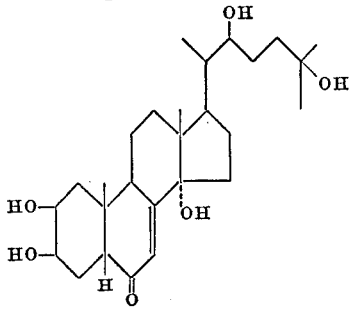
References Cited
Huber et al.; "Chem. Berichte" (1965) page 2410 relied upon.
Merck Index (1960), Published by Merck and Co. Inc., Rahway, N.J., page 395 relied on.
ELBERT L. ROBERTS, *Primary Examiner.*
U.S. Cl. X.R.
195—51; 260—239.55

UNITED STATES PATENT OFFICE
CERTIFICATE OF CORRECTION

Patent No. 3,442,917                                         May 6, 1969

Rudolf Wiechert et al.

It is certified that error appears in the above identified patent and that said Letters Patent are hereby corrected as shown below:

Column 6, lines 51 to 64, the upper right-hand portion of the formula should appear as shown below:

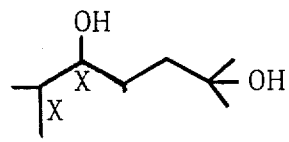

Signed and sealed this 28th day of April 1970.

(SEAL)
Attest:

Edward M. Fletcher, Jr.                    WILLIAM E. SCHUYLER, JR.
Attesting Officer                              Commissioner of Patents